United States Patent
Hwang (10) Patent No.: US 7,310,062 B1
(45) Date of Patent: Dec. 18, 2007

(54) DUAL ANTENNA DIVERSITY METHOD TO DETECT GPS SIGNAL TAMPERING

(75) Inventor: Patrick Y. Hwang, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 120 days.

(21) Appl. No.: 11/191,673

(22) Filed: Jul. 28, 2005

(51) Int. Cl.
*G01S 1/00* (2006.01)
*G01S 5/14* (2006.01)

(52) U.S. Cl. .............................. 342/357.02; 342/357.04

(58) Field of Classification Search ................ 342/357; 701/213
See application file for complete search history.

(56) References Cited

U.S. PATENT DOCUMENTS

| | | | | |
|---|---|---|---|---|
| 5,296,861 | A * | 3/1994 | Knight | 342/357.11 |
| 5,610,614 | A * | 3/1997 | Talbot et al. | 342/352 |
| 6,268,824 | B1 * | 7/2001 | Zhodzishky et al. | 342/357.04 |
| 6,424,915 | B1 * | 7/2002 | Fukuda et al. | 701/214 |
| 6,639,541 | B1 * | 10/2003 | Quintana et al. | 342/18 |
| 6,674,399 | B2 * | 1/2004 | Zhodzishky et al. | 342/357.03 |
| 6,720,914 | B2 * | 4/2004 | Toda et al. | 342/357.04 |
| 6,754,584 | B2 * | 6/2004 | Pinto et al. | 701/215 |
| 2003/0085839 | A1 * | 5/2003 | Zhodzishky et al. | 342/357.12 |
| 2003/0154049 | A1 * | 8/2003 | Toda | 702/151 |
| 2004/0145518 | A1 * | 7/2004 | Toda et al. | 342/357.04 |
| 2004/0257275 | A1 * | 12/2004 | Yee et al. | 342/357.02 |
| 2005/0137799 | A1 * | 6/2005 | Alban et al. | 701/213 |

OTHER PUBLICATIONS

"New Algorithm for Attitude Determination Using GPS Signals", F. Berneli-Zazzera et al., XVI Congresso Nazionale AIDAA, Sep. 24-28, 2001, Palermo, Italy.

"Basics of the GPS Technique: Observation Equations" Geoffrey Blewitt, from the textbook "Geodetic Applications of GPS", published by the Swedish Land Survey, 1997.

"HAZMAT Keeps on Truckin'" Glenn Gibbons, GPS World, Oct. 1, 2004.

*GPS Theory and Practice*, pp. 163-164, B. Hofmann-Wellenhof, H. Lichtenegger and J. Collins, 4th revised edition, Springer-Verlag Wien, New York, 1997.

\* cited by examiner

*Primary Examiner*—Thomas Tarcza
*Assistant Examiner*—Harry Liu
(74) *Attorney, Agent, or Firm*—Nathan O. Jensen; Kyle Eppele (57) ABSTRACT

A method of detecting GPS signal tampering uses two GPS receivers. A first receiver measures carrier phases of two or more satellite signals and of a tampered signal. A second receiver measures carrier phases of the two or more satellite signals and the tampered signal. A baseline vector between the receiver antennas is measured. Direction cosine vectors of the two or more satellite signals are computed and a dot product is computed from the baseline vector to translate measurements made at antennas of the GPS receivers to a virtual zero baseline condition. The carrier phase measurements are double differenced to obtain double difference residuals. A test statistic of the double difference residuals is computed and tested for phase coherency. An inconsistency in measured signals is flagged when there is an inconsistency in phase coherence indicating the tampered signal is present.

16 Claims, 6 Drawing Sheets

DUAL ANTENNA DIVERSITY METHOD TO DETECT GPS SIGNAL TAMPERING

GOVERNMENT RIGHTS

This invention was made with Government support under Contract No. F04701-03-C-0025 GPS Modernized User Equipment (MUE) Program Research & Development Announcement (PRDA) awarded by US Air Force Space and Missiles System Center, Global Positioning System (GPS) Joint Program Office. The Government may have certain rights in the invention.

BACKGROUND OF THE INVENTION

This invention relates to Global Navigation Satellite Systems (GNSS), the Global Positioning System (GPS), GPS receivers, and specifically to a method of detecting GPS signal tampering.

GPS signal tampering can pose a significant threat to any safety critical system by presenting it intentionally with misleading navigation information. This is achieved by transmitting a GPS-like signal or retransmitting a GPS signal that has been tampered with so that a target GPS receiver assimilates erroneous signal measurements into its navigation solution.

There are potentially many solutions, ranging widely in complexity that can protect the GPS receiver from such threats to varying degrees. Signal tampering threats have traditionally been important more for military than civilian applications, but a recent article in GPS World magazine written on the need for signal security for Hazmat transportation and civil aircraft integrity highlights a shift in the area of applicability for anti-tampering solutions. For military applications, this threat issue has been a constant component of the Modernized User Equipment (MUE) study program.

A need exists for a simple, low-cost, method of protection of GPS receivers from GPS signal tampering.

SUMMARY OF THE INVENTION

A method of detecting GPS signal tampering using dual antenna diversity is disclosed. Carrier phases of two or more satellite signals and a tampered signal are measured with a first antenna and a first GPS receiver. Carrier phases of the two or more satellite signals and the tampered signal are measured with a second antenna and a second GPS receiver. A baseline vector between the first antenna and the second antenna is independently determined. The carrier phase measurements made at the first antenna are translated to a virtual zero baseline condition with the second antenna using the baseline vector. The translated carrier phase measurements of the first GPS receiver and the carrier phase measurements of the second GPS receiver are double differenced to obtain double difference residuals. A test statistic of the double difference residuals is computed and compared to a threshold. An inconsistency in measured signals is flagged when the threshold is exceeded thereby indicating the tampered signal is present.

The method of detecting GPS signal tampering using two GPS receivers further comprises computing direction cosine vectors of the two or more satellite signals with the first GPS receiver, computing a vector dot product of the baseline vector and the direction cosine vector, and subtracting the dot product from a carrier phase measurement of a first tampered signal from a first satellite to produce a translated carrier phase measurement of the first tampered signal from the first satellite thereby effectively translating the antenna of the first GPS receiver to a virtual zero baseline condition with the antenna of the second GPS receiver. The method further comprises subtracting a carrier phase measurement of a second tampered signal from the first satellite from the translated carrier phase measurement of the first tampered signal from the first satellite to produce a first single difference.

The method of detecting GPS signal tampering using dual antenna diversity while tracking GPS satellites further comprises repeating the steps of the previous paragraph on a second satellite signal to yield a second single difference, double differencing the first single difference and the second single difference to obtain tampered signal double difference residuals, computing a test statistic of the tampered signal double difference residuals, comparing the test statistic of the tampered signal double difference residuals to the threshold, and flagging an inconsistency in measured signals when the threshold is exceeded thereby indicating the tampered signal is present.

It is an object of the present invention to detect a tampered signal that can present intentionally misleading navigation information.

It is an object of the present invention to provide tampered signal detection using carrier phase discrepancy detection It is an advantage of the present invention to use readily available low-cost GPS receivers.

It is an advantage of the present invention to provide a modular architecture with single antenna GPS receivers operating independently and combining baseband carrier phase data.

It is a feature of the present invention to provide considerable robustness against signal tampering threats.

It is a feature of the present invention to provide a low-cost solution to tampered signal identification.

BRIEF DESCRIPTION OF THE DRAWINGS

The invention may be more fully understood by reading the following description of the preferred embodiments of the invention in conjunction with the appended drawings wherein.

DETAILED DESCRIPTION

The present invention is for a dual antenna diversity solution to protect against GPS signal tampering. While the present invention is described below as applicable to the GPS system it is within the scope of the present invention to cover other present and future GNSS systems.

Figure 1:
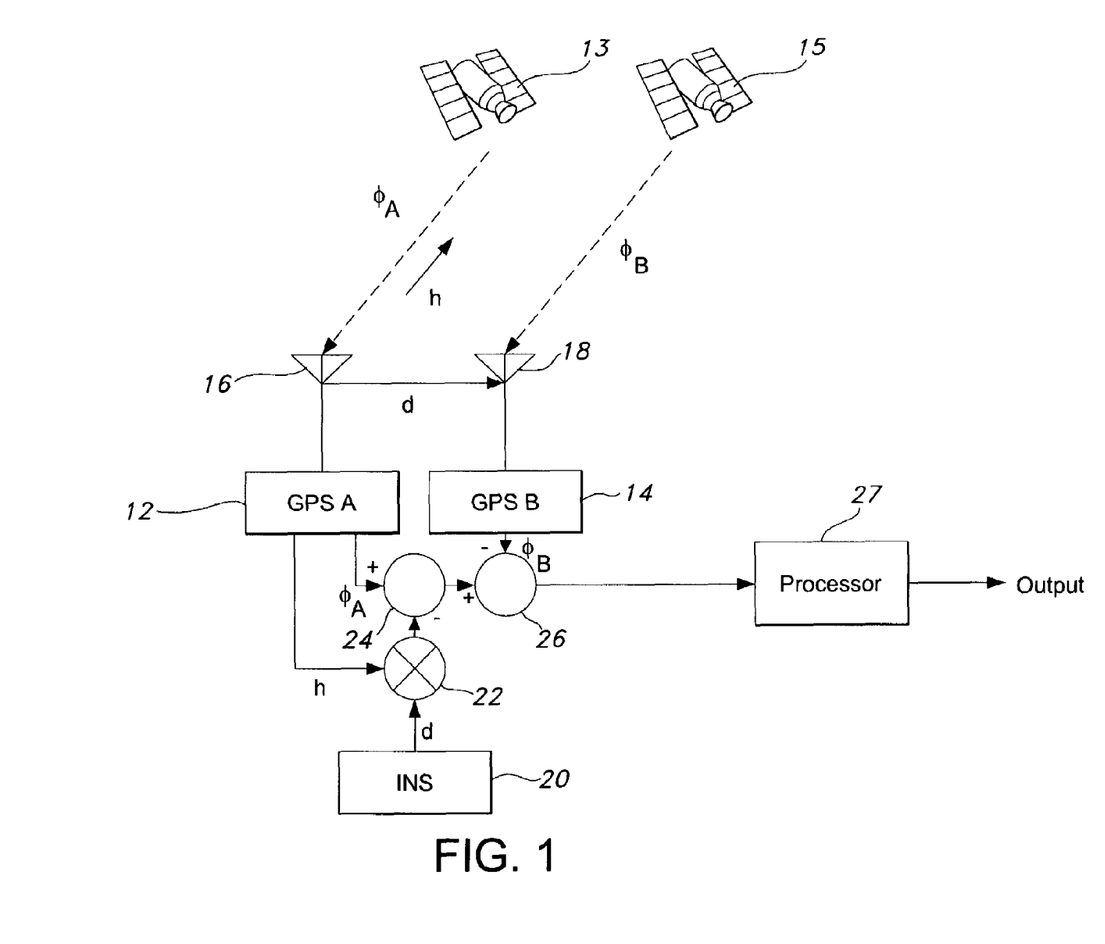
FIG. 1 shows two GPS receivers connected to antennas and tracking GPS satellites to make direct signal measurements of carrier phase.

FIG. 1 shows two GPS receivers, GPS A 12 and GPS B 14, connected to antennas 16 and 18 respectively and tracking a first GPS satellite 13 to make direct signal measurements of carrier phase $\phi$. The first receiver 12 provides a first carrier phase measurement $\phi_A$ and a direction cosine vector h to the first GPS satellite 13. The second receiver 14 provides a second carrier phase measurement $\phi_B$. An independent means may be used to determine a baseline vector, d, between the first antenna 16 and the second antenna 18 such as an inertial sensor 20.

When the two GPS receivers, GPS A 12 and GPS B 14, are independently tracking the same satellite signal and the baseline vector, d, adjoining their antenna 16 and 18 positions is accurately known, then full-cycle carrier phase measurements, $\phi_A$ and $\phi_B$, of both receivers 12 and 14 made nearly simultaneously at each GPS epoch can be double-differenced. A single difference of carrier phase measurements is made between receivers 12 and 14 for the first satellite 13 and a double difference of carrier phase measurements is made between any two satellites such as the first satellite 13 and a second satellite 15 in FIG. 1. Other pairs of satellites (not shown) may also be used.

Double difference processing, performed by a dot product function 22 and adders 24 and 26, is shown in FIG. 1. Additional double difference and other processing is performed by a processor 27. All processing shown in FIG. 1 may be performed in the processor 27.

In FIG. 1 the baseline vector d, derived from an attitude/heading output from the inertial sensor 20, is combined with the direction cosine vector h to compute a vector dot product by the dot product function 22. The dot product of the baseline vector d and the direction cosine vector h compensates for the separation of the receiver antennas and translates carrier phase measurements at the two receiver antennas 16 and 18 to a same location giving the effect of a zero baseline condition. For example the dot product, d·h, is subtracted from the first carrier phase measurement, $\phi_A$, in adder 24 to yield $\phi_A$−d·h thereby translating the first carrier phase measurement, $\phi_A$, at antenna 16 to the location of antenna 18. The dot product may also be subtracted from the second carrier phase measurement $\phi_B$ to translate the second carrier phase measurement $\phi_B$ at antenna 18 to the location of antenna 16. The quantity $\phi_A$−d·h from adder 24 has the second carrier phase measurement $\phi_B$ subtracted from it in adder 26 to yield $\phi_A$−d·h−$\phi_B$ as the first single difference output between the receivers GPS A 12 and GPS B 14 for the first satellite 13. The process of equation 1 is repeated for the second satellite 15 to obtain a second single difference. The first single difference and the second single difference are subtracted to obtain the double difference. If double difference carrier phases, one for each satellite pair 13 and 15, are compensated for the known antenna baseline vector d, the resulting profiles have flat trends and may be biased by an integer cycle and noise, as shown in Equation 1

$$\phi_A - d\cdot h - \phi_B = 0(+N+n) \quad \text{Equation 1}$$

where $\phi_A$, $\phi_B$, and d are in units of carrier cycles and one cycle is one wavelength, N=integer, and n=noise.

Calculating the single difference from one satellite 13 between antennas 16 and 18 first and then calculating the double difference between the single differences as described above is an arbitrary choice of steps. Double difference processing may also be done in reverse by calculating a first difference between satellites 13 and 15 for the first antenna 16 and then calculating a second difference between the first antenna 16 and the second antenna 18. It is within the scope of the present invention to obtain the double difference using either method.

Note that the assumption of the known baseline vector d is important to this solution. On a moving platform, baseline orientation data has to be derived from the inertial sensor (INS) 20 or equivalent sensor. This is generally a non-issue on aircraft platforms that are usually already equipped with the INS 20 or an AHRS (attitude and heading reference system) not shown. On ground vehicles equipped with neither, a tilt sensor (for pitch and roll) combined with ground track (for heading) may be a suitable replacement. The antenna separation only needs to be a few carrier wavelengths but should not be too large in order to reduce the error sensitivity of the solution to baseline orientation errors. An antenna separation in the order of about half a meter appears to be a good compromise.

Figure 2:
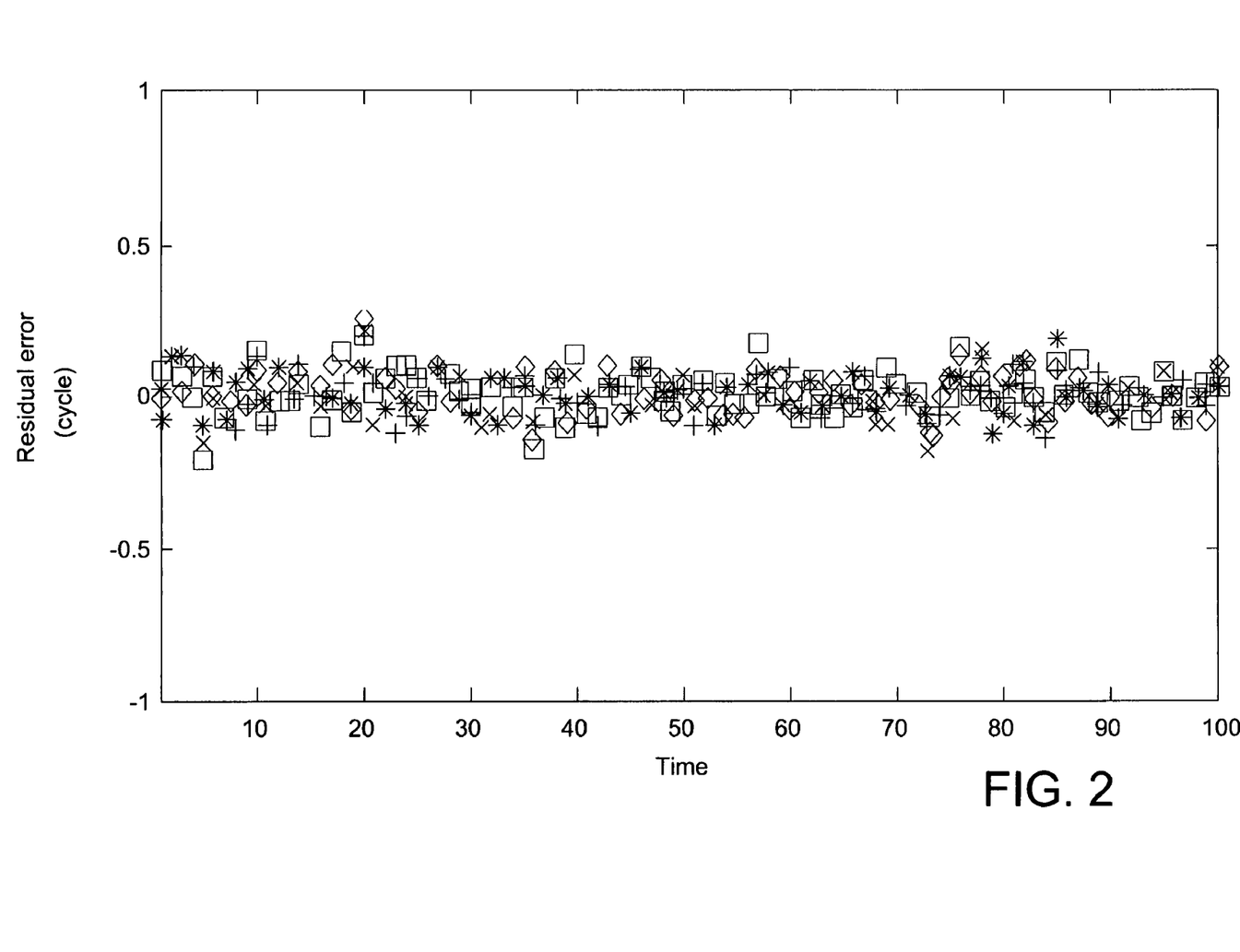
FIG. 2 shows the double difference residual error profiles (adjusted for the proper integer cycle ambiguities) associated for each satellite when the two GPS receivers are as if sharing one antenna in a virtual zero baseline condition.

Further processing of the double difference residuals is performed by the processor 27 in FIG. 1. FIG. 2 shows the double difference residual error profiles from Equation 1 associated for each satellite in cycles over time in seconds as if the two receivers 12 and 14 are sharing one antenna in the virtual zero baseline condition after proper adjustment for the integer cycle ambiguities. With the virtual zero baseline condition, biases such as those that are satellite and atmospheric path dependent cancel. Multipath errors at the two antennas 16 and 18 in close proximity are strongly correlated and largely cancel in the differencing as well. The quality of the resulting virtual zero baseline profiles is a function of random observation error or noise and any receiver biases that do not cancel in double differencing.

Figure 3:
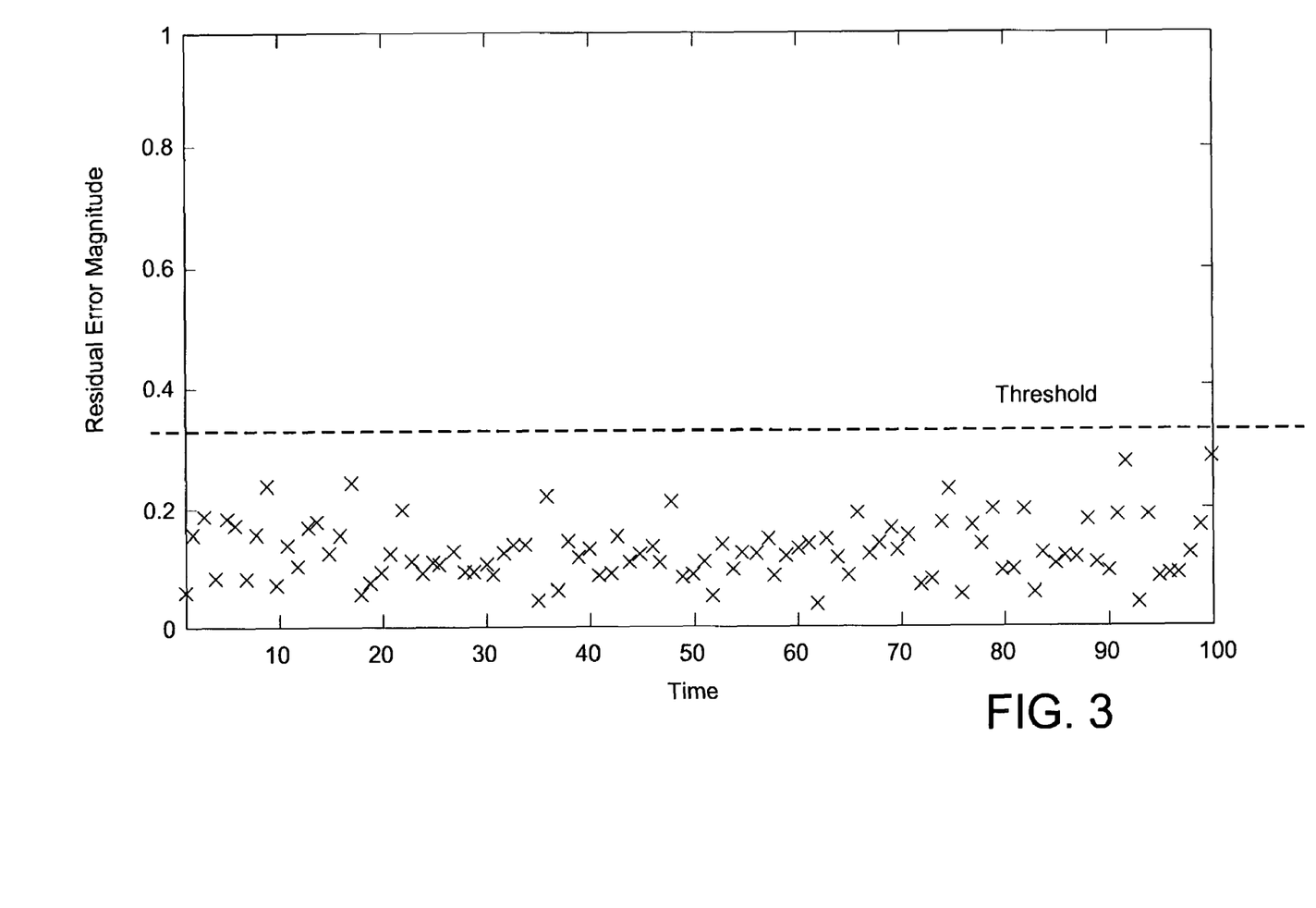
FIG. 3 shows results of a statistical test may be made to form a mean-square of the residuals of FIG. 2 tested against a threshold derived for an acceptable false alarm rate.

The double difference residuals formed from all available satellites are tested for zero baseline coherency in the processor 27. One test statistic that is representative of this coherency may be the mean-square of these residuals where it would be tested against a threshold that is derived for an acceptable false alarm rate (the distribution is approximately chi-square if the measurement noise is Gaussian-distributed). FIG. 3 shows results of such a comparison test. This type of testing methodology is well known in the art. All data shown are simulated, and account for white noise and antenna displacement only.

Figure 4:
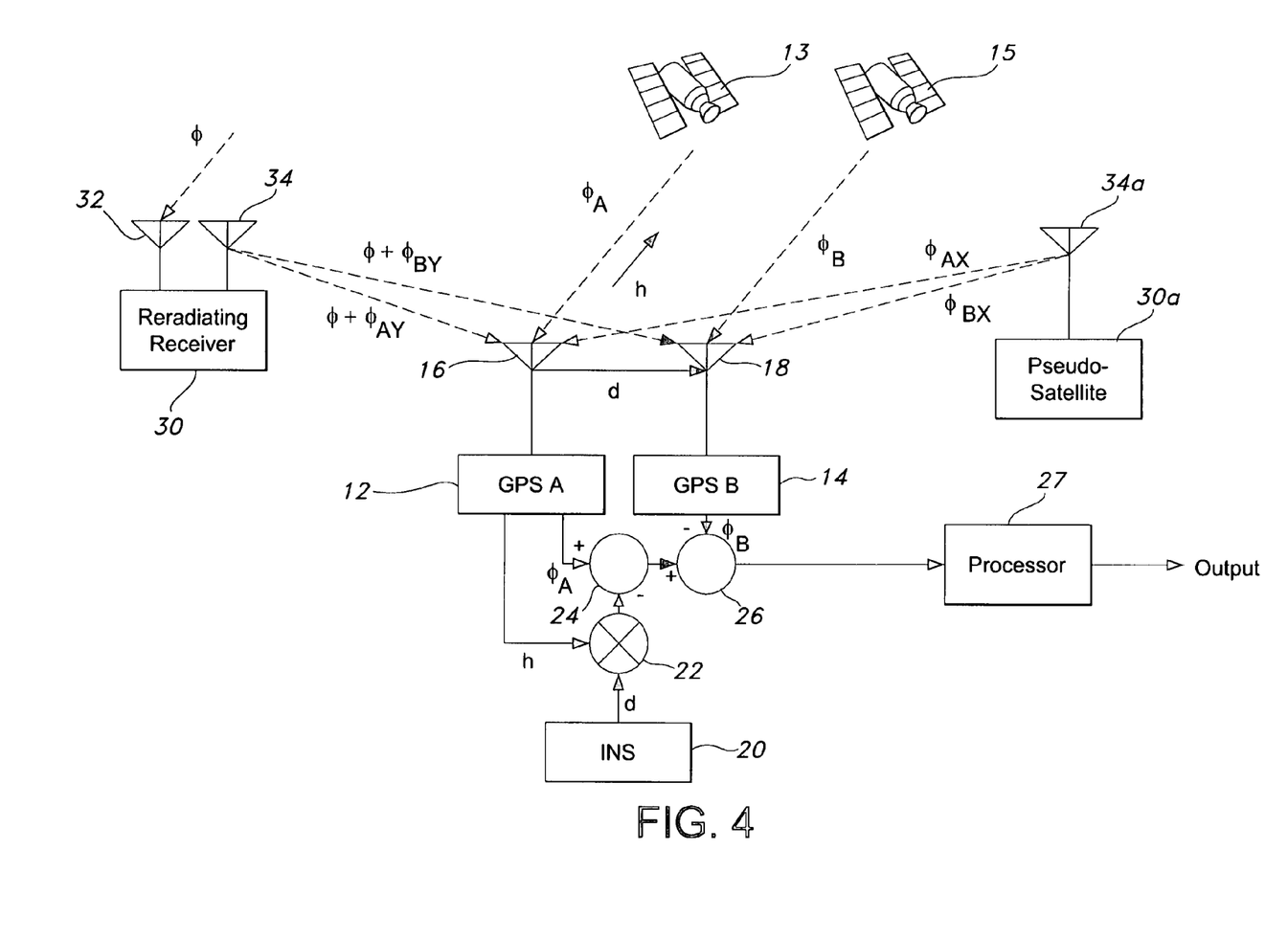
FIG. 4 shows measurement geometries for GPS signal tampering.

FIG. 4 shows measurement geometries for GPS signal tampering. A bent-pipe reradiating receiver 30 may be detected by the present invention of FIG. 1. The bent-pipe reradiating receiver 30 receives a signal with antenna 32 from the first satellite 13 and adds an additional carrier phase shift $\phi$ upon reradiating. The bent-pipe reradiating receiver 30 reradiates the received signal with antenna 34 as a tampered signal with the additional carrier phase shift $\phi$. The receivers, GPS A 12 and GPS B 14, receive the tampered signal with antennas 16 and 18 respectively, with the antennas separated by baseline vector d. First receiver 12 receives first tampered signal ($\phi+\phi_{AT}$) while second receiver 14 receives second tampered signal ($\phi+\phi_{BT}$). The receivers 12 and 14 receive the carrier phase signals as before with the carrier phase shift $\phi$ added by the bent-pipe reradiating receiver 30. The double difference processing is as before between satellite 13 and 15 with the baseline vector d input from INS 20, computing the dot product of baseline vector d and direction cosine vector h with the dot product function 22, and the differencing in the adders 24 and 26. The tampered signal single difference processing result is shown in Equation 2 for the first satellite 13 and is repeated for the second satellite 15 for tampered signal double differencing.

$$(\phi+\phi_{AT}) - d\cdot h - (\phi+\phi_{BT}) \neq 0(+N+n) \quad \text{Equation 2}$$

Figure 5:
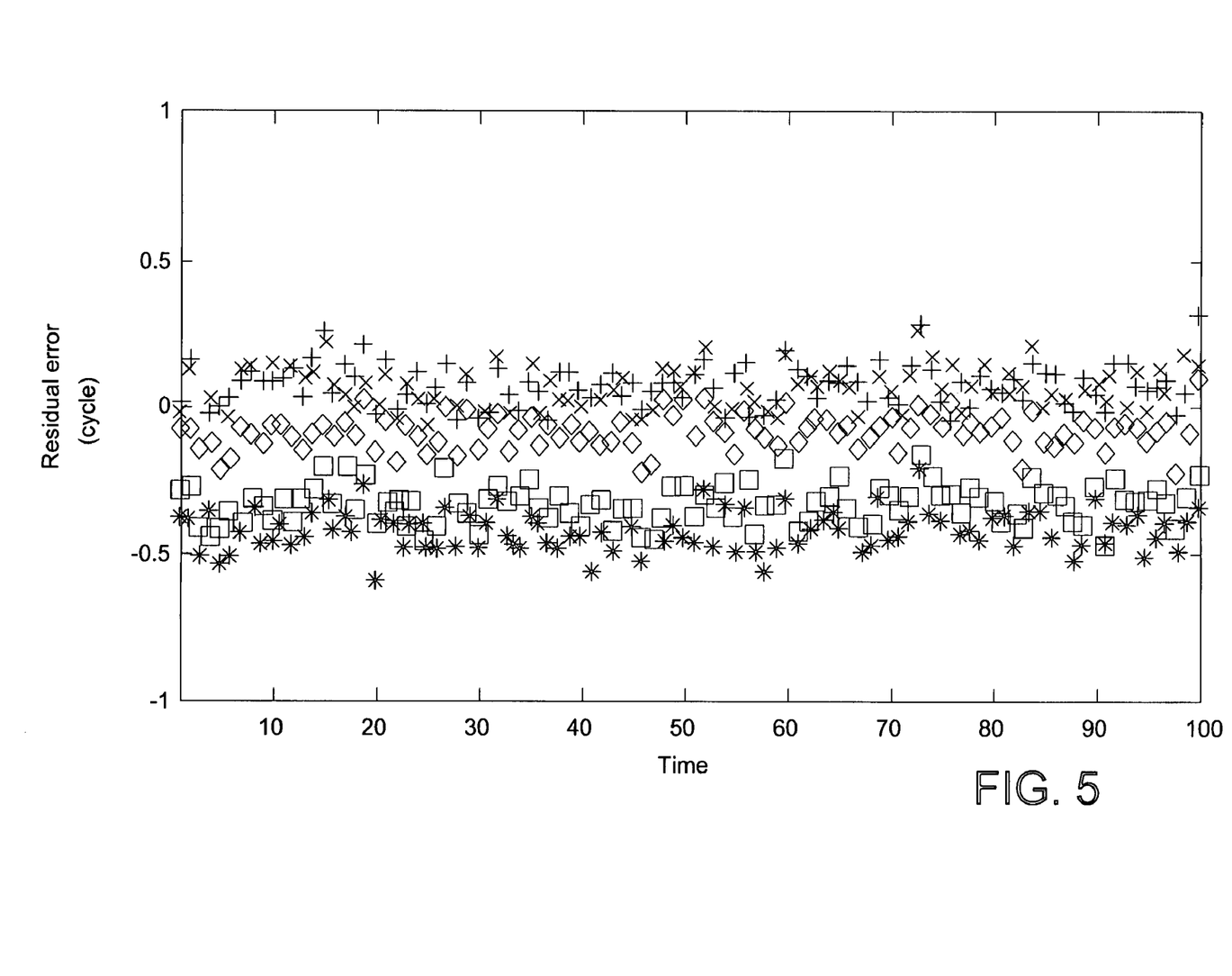
FIG. 5 shows the double difference residuals associated for each satellite corresponding to signal tampering.

In general, the statistical distribution of this result does not have a zero mean as in Equation 1 that shows normal processing. FIG. 5 shows the double difference residuals associated for each satellite corresponding to the tampered signals from the bent-pipe reradiating receiver 30. The profiles for the various satellites are scattered over a range of ±0.5 cycle.

Figure 6:
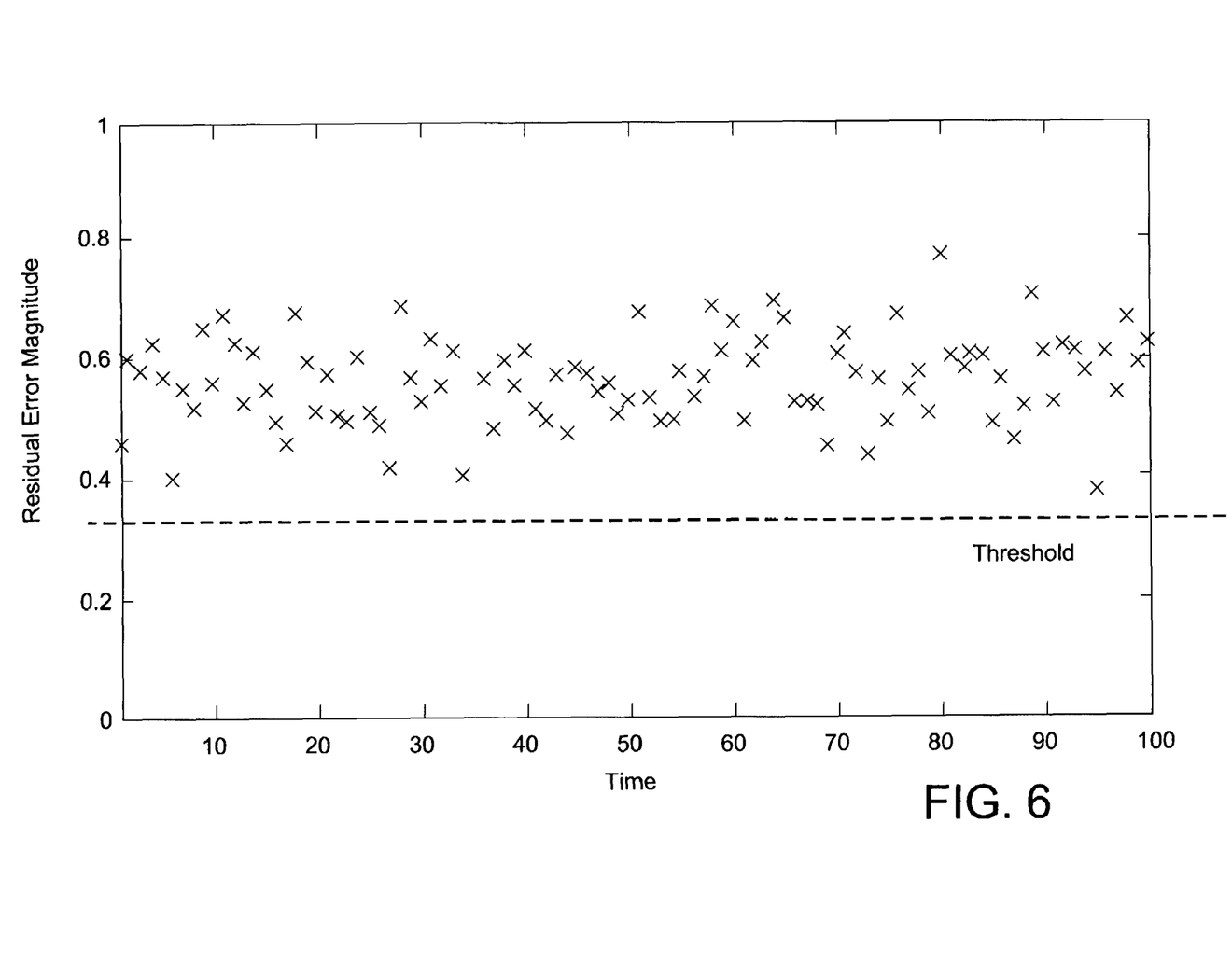
FIG. 6 shows the statistical test using the mean-square of the double difference residuals.

The tampered signal double difference residuals are tested for the coherency criteria in processor 27 in FIG. 4. FIG. 6 shows the test statistic using the mean-square of the double difference residuals. The test statistics clearly exceed the threshold and an inconsistency in the measured signals is flagged as an output from processor 27 thereby indicating that the tampered signals are present.

The same scheme is also applicable to protect against tampered signals that are more sophisticated than the bent-pipe reradiating receiver 30, particularly ones that mimic individual satellites such as a pseudo-satellite 30a in FIG. 4. Pseudo-satellite 30a radiates signals from antenna 34a that mimic satellites 13 and 15 and have carrier phases of $\phi_{AX}$ and $\phi_{BX}$. Even with a pseudo-satellite 30a, unless it is transmitting along the line-of-sight of one of the satellites 13 and 15, the carrier phase discrepancy is detectable.

The present invention comprises the novel simplicity of using multiple single-antenna GPS receivers operating independently and combining baseband carrier phase data to provide an effective test against signal tampering. This approach involves at least two receivers, but the drawback of the added cost of an extra unit is minimal with the availability of low-cost GPS receivers in abundance. Such a drawback is balanced out with the attractiveness of the modularity of the architecture and considerable robustness to signal tampering threats that the solution yields.

It is believed that the dual antenna diversity method to detect GPS signal tampering of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A method of detecting GPS signal tampering using dual antenna diversity while tracking GPS satellites comprising the steps of:

measuring a first carrier phase of a first satellite signal at a first antenna with a first GPS receiver;

measuring a second carrier phase of the first satellite signal at a second antenna with a second GPS receiver;

measuring a first carrier phase of a second satellite signal at the first antenna with the first GPS receiver measuring a second carrier phase of the second satellite signal at the second antenna with the second GPS receiver determining a baseline vector between the first antenna and the second antenna;

translating the first carrier phase measurement of the first satellite signal and the first carrier phase measurement of the second satellite signal to a virtual zero baseline condition with the second antenna with the baseline vector;

double differencing the translated first carrier phase measurement of the first satellite signal, the translated first carrier phase measurement of the second satellite, the second carrier phase measurement of the first satellite signal, and the second carrier phase measurement of the second satellite signal to obtain double difference residuals;

computing a test statistic of the double difference residuals; determining a threshold;

comparing the test statistic of the double difference residuals to the threshold; and flagging an inconsistency in measured signals when the threshold is exceeded thereby indicating a tampered signal is present.

2. The method of detecting GPS signal tampering using dual antenna diversity while tracking GPS satellites of claim 1 wherein the step of translating carrier phase measurements further comprises the steps of:

computing a direction cosine vector of the first satellite signal with the first GPS receiver;

computing a first dot product from the baseline vector and the direction cosine vector of the first satellite signal;

subtracting the first dot product from the first carrier phase measurement of the first satellite signal to produce the translated first carrier phase measurement of the first satellite signal;

computing a direction cosine vector of the second satellite signal with the first GPS receiver;

computing a second dot product from the baseline vector and the direction cosine vector of the second satellite signal; and subtracting the second dot product from the first carrier phase measurement of the second satellite signal to produce the translated first carrier phase measurement of the second satellite signal.

3. The method of detecting GPS signal tampering using dual antenna diversity while tracking GPS satellites of claim 2 wherein the step of double differencing translated carrier phase measurements further comprises the steps of:

subtracting the second carrier phase measurement of the first satellite signal from the translated first carrier phase measurement of the first satellite signal to produce a first single difference;

subtracting the second carrier phase measurement of the second satellite signal from the second difference to produce a second single difference; and subtracting the first single difference from the second single difference to obtain the double difference.

4. The method of detecting GPS signal tampering using dual antenna diversity while tracking GPS satellites of claim 1 further comprising the steps of:

measuring a first carrier phase of the tampered signal from a first satellite with the first GPS receiver;

measuring a second carrier phase of the tampered signal from the first satellite with the second GPS receiver;

measuring a first carrier phase of the tampered signal from a second satellite with the first GPS receiver;

measuring a second carrier phase of the tampered signal from the second satellite with the second GPS receiver;

translating the first tampered signal carrier phase measurement of the first satellite signal and the first tampered signal carrier phase measurement from the second satellite to the virtual zero baseline condition with the second antenna using the baseline vector;

double differencing the translated first tampered carrier phase measurement of the first satellite, the translated first tampered carrier phase measurement of the second satellite, the second carrier phase measurement of the tampered signal from the first satellite, and the second carrier phase measurement of the tampered signal from the second satellite to obtain tampered signal double difference residuals;

computing a test statistic of the tampered signal double difference residuals;

comparing the test statistic of the tampered signal double difference residuals to the threshold; and flagging an inconsistency in measured signals when the threshold is exceeded thereby indicating the tampered signal is present.

5. The method of detecting GPS signal tampering using dual antenna diversity while tracking GPS satellites of claim 4 wherein the step of computing a test statistic further comprises computing a mean square of double difference residuals.

6. The method of detecting GPS signal tampering using dual antenna diversity while tracking GPS satellites of claim 1 wherein the step of determining a baseline vector between the first antenna and the second antenna is performed from attitude and heading measurements provided by an inertial navigation system.

7. A system for detecting GPS signal tampering using dual antenna diversity while tracking GPS satellites comprising;

a first antenna for receiving satellite signals from at least two satellites;

a first GPS receiver connected to the first antenna and for measuring first carrier phases and computing direction cosine vectors of the satellite signals;

a second antenna for receiving the satellite signals from the at least two satellites;

a second GPS receiver connected to the second antenna and for measuring second carrier phases of the satellite signals;

means for determining a baseline vector between the first antenna and the second antenna;

means for translating first carrier phase measurements made at the first antenna to a virtual zero baseline condition with the second antenna;

means for double differencing the translated first carrier phase measurements and the second carrier phase measurements to obtain double difference residuals;

means for computing a test statistic of the double difference residuals;

means for computing a test statistic threshold;

means for comparing the test statistic of the double difference residuals to the threshold; and means for flagging an inconsistency in measured signals when the threshold is exceeded thereby indicating tampered signals are present.

8. The system for detecting GPS signal tampering using dual antenna diversity while tracking GPS satellites of claim 7 wherein the means for translating the first carrier phase measurements to the virtual zero baseline condition comprises means for computing dot products of the baseline vector and the direction cosine vectors and subtracting the dot products from the first carrier phase measurements to yield the translated first carrier phase measurements.

9. The system for detecting GPS signal tampering using dual antenna diversity while tracking GPS satellites of claim 8 wherein the means for means for double differencing the translated first carrier phase measurements and the second carrier phase measurements to obtain double difference residuals comprises:

means for subtracting the second carrier phase measurements from the translated first carrier phase measurements to yield single differences; and means for subtracting the single differences from each other to yield double differences.

10. The system for detecting GPS signal tampering using dual antenna diversity while tracking GPS satellites of claim 7 further comprising:

the first GPS receiver for measuring carrier phases of the tampered signals at the first antenna;

the second GPS receiver for measuring carrier phases of the tampered signals at the second antenna;

the means for translating carrier phase measurements of the tampered signals made at the first antenna to a virtual zero baseline condition with the second antenna;

the means for double differencing the translated carrier phase measurements of the tampered signals at the first antenna and the carrier phase measurements of the tampered signal at the second antenna to obtain tampered signal double difference residuals;

the means for computing a test statistic of the tampered signal double difference residuals; and the means for comparing the test statistic of the tampered signal double difference residuals to the threshold.

11. The system for detecting GPS signal tampering using dual antenna diversity while tracking GPS satellites of claim 7 wherein the means for determining the baseline vector comprises one of an inertial navigation system and an attitude and heading reference system.

12. A method of detecting tampered signals using two GPS receivers comprising the steps of:

measuring carrier phases of two or more satellite signals and of the tampered signals at a first antenna with a first GPS receiver;

measuring carrier phases of the two or more satellite signals and of the tampered signals at a second antenna with a second GPS receiver determining a baseline vector between the first antenna and the second antenna;

translating carrier phase measurements made at the first antenna to a virtual zero baseline condition with the second antenna using the baseline vector;

double differencing the translated carrier phase measurements at the first antenna with the first GPS receiver and the carrier phase measurements at the second antenna with the second GPS receiver to obtain double difference residuals;

testing the double difference residuals for a coherency criteria; and indicating the tampered signal are present when the coherency criteria are not met.

13. The method of detecting tampered signals using two GPS receivers of claim 12 wherein the step of testing the double difference residuals further comprises the steps of:

computing a mean square of the double difference residuals; and comparing the mean square of the double difference residuals to a threshold.

14. The method of detecting tampered signals using two GPS receivers of claim 12 wherein the step of translating carrier phase measurements further comprises the steps of:

computing a direction cosine vector of a first satellite signal: and computing a dot product from the baseline vector and the direction cosine vector of the first satellite signal;

subtracting the dot product from a carrier phase measurement of a first tampered signal from a first satellite to produce a translated first tampered signal carrier phase measurement from the first satellite;

computing a direction cosine vector of a second satellite signal; and computing a dot product from the baseline vector and the direction cosine vector of the second satellite signal; and subtracting the dot product from a carrier phase measurement of a second tampered signal from a second satellite to produce a translated second tampered signal carrier phase measurement from the second satellite.

15. The method of detecting tampered signals using two GPS receivers of claim 14 wherein the step of double differencing translated carrier phase measurements further comprises the steps of:

subtracting a carrier-phase measurement of a second tampered signal from the first satellite from the translated first tampered signal carrier phase measurement from the first satellite to produce a first tampered single difference; and subtracting a carrier phase measurement of a second tampered signal from the second satellite from the translated first tampered signal carrier phase measurement from the second satellite to produce a second tampered single difference.

16. The method of detecting tampered signals using two GPS receivers of claim 15 further comprising the steps of:

double differencing the first tampered single difference and the second tampered single difference to obtain tampered signal double difference residuals;

computing a mean square of the tampered signal double difference residuals;

comparing the mean square of the tampered signal double difference residuals to the threshold; and indicating the tampered signal is present when the threshold is exceeded.

* * * * *